UNITED STATES PATENT OFFICE.

JOHN GEORGE STEPHENS, OF JERSEY CITY, NEW JERSEY, ASSIGNOR TO THE CLARE FIBRE COMPANY, OF SAME PLACE.

VEGETABLE FIBER FROM PINE-LEAVES AND OTHER VEGETABLE SUBSTANCES.

SPECIFICATION forming part of Reissued Letters Patent No. 9,581, dated February 22, 1881.

Original No. 235,310, dated December 7, 1880. Application for reissue filed January 27, 1881.

*To all whom it may concern:*

Be it known that I, JOHN GEORGE STEPHENS, of Jersey City, in the county of Hudson and State of New Jersey, have invented a new and useful Improvement in Vegetable Fiber from Pine-Leaves and other Vegetable Substances, of which the following is a specification.

My invention relates more particularly to the fiber obtained from Southern pine-leaves and used for upholstering and other purposes, but is also applicable to the fiber of other vegetable substances.

It consists of the fiber produced in crimped form or condition when delivered from the treatment and apparatus by which it is relieved of the pulpy and other matters of the natural state, whereby its usefulness for cushions, mattresses, and other articles in upholstery is greatly increased, the crimps or kinks giving it the nature of curled hair.

As heretofore prepared for such use the fibers have been plain and straight, so that however they may be crossed by bunching and mixing together they soon pack down flat and hard like hay and straw. Attempts have also been made to curl these fibers as hair is curled by twisting them in the form of ropes and subsequently picking the ropes apart by the use of picking machinery. The fibers lack the strength to bear the picking process without breaking, and they do not in that way get the permanent set necessary for durability, as the ropes must be picked before the fibers are sufficiently dry to be permanently set; but when crimped or corrugated as I propose their power of elasticity is very greatly increased and made more lasting; and after the crimping process, which is also a drying process, the fiber is not handled or disturbed until thoroughly dry and permanently set.

The crimping may be done in various ways, but the simplest method is by means of crimping-rollers, the fiber being passed through them after it is manufactured from the raw material, and various devices may be resorted to to render its condition such at the time of passing through the crimping-rollers that the set of the crimps given by the rollers will be permanent. For example, certain degrees of moisture and temperature best suited to the purpose may be provided, and the material may be moistened or more or less saturated with gummy or resinous substances calculated to have that effect.

I do not claim, broadly, the fiber manufactured from pine-leaves and other vegetable substances, nor such fiber when twisted; but What I do claim is—

The new article of manufacture consisting of the fiber made from pine-leaves and other vegetable substances when crimped or corrugated, substantially as described.

JOHN GEORGE STEPHENS.

Witnesses:
F. A. THAYER,
S. H. MORGAN.